(12) United States Patent
Watabe

(10) Patent No.: US 9,141,336 B2
(45) Date of Patent: Sep. 22, 2015

(54) DATA TRANSFER DEVICE

(75) Inventor: Ryosuke Watabe, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/984,872

(22) PCT Filed: Feb. 14, 2012

(86) PCT No.: PCT/JP2012/053363
§ 371 (c)(1),
(2), (4) Date: Aug. 12, 2013

(87) PCT Pub. No.: WO2012/111653
PCT Pub. Date: Aug. 23, 2012

(65) Prior Publication Data
US 2013/0318260 A1    Nov. 28, 2013

(30) Foreign Application Priority Data

Feb. 16, 2011  (WO) ................. PCT/JP2011/053249

(51) Int. Cl.
*G06F 5/12*    (2006.01)
*G06F 13/00*   (2006.01)
*G05B 19/05*   (2006.01)

(52) U.S. Cl.
CPC   *G06F 5/12* (2013.01); *G05B 19/05* (2013.01); *G06F 13/00* (2013.01)

(58) Field of Classification Search
None
See application file for complete search history.

(56) References Cited

FOREIGN PATENT DOCUMENTS

| JP | 2001-100810 A | 4/2001 |
|---|---|---|
| JP | 2002-297206 A | 10/2002 |
| JP | 2003-114908 A | 4/2003 |
| JP | 2004-88697 A | 3/2004 |
| JP | 2005-269004 A | 9/2005 |
| JP | 2006-215999 A | 8/2006 |
| JP | 2007-172263 A | 7/2007 |
| JP | 2008-15722 A | 1/2008 |
| JP | 4419617 B2 | 2/2010 |
| JP | 2010-198414 A | 9/2010 |

OTHER PUBLICATIONS

International Search Report for PCT/JP2012/053363 dated May 22, 2012.

(Continued)

*Primary Examiner* — Idriss N Alrobaye
*Assistant Examiner* — Dayton Lewis-Taylor
(74) *Attorney, Agent, or Firm* — Sughrue Mion, PLLC; Richard C. Turner

(57) ABSTRACT

A data transfer unit includes: a collection-interval storage unit that storing therein a collection interval set by the host computer; a data collection unit reading a collection interval stored in the collection-interval storage unit and collecting device data at the read collection interval; a transfer-interval storage unit storing therein a transfer interval set by the host computer, which is equal to or larger than the collection interval; a ring buffer accumulating and storing therein device data that are collected by the data collection unit and have not been transferred to the host computer by a data transferring unit; and a data transferring unit reading a transfer interval stored in the transfer-interval storage unit, and collectively transfers device data accumulated and stored in the ring buffer to the host computer at the read transfer interval.

11 Claims, 10 Drawing Sheets

(56) References Cited

OTHER PUBLICATIONS

Japanese Office Action issued Aug. 13, 2013, Patent Application No. 2012-557966.

Taiwanese Office Action, mailed Apr. 17, 2014, Application No. 101104876.

Communication dated Aug. 18, 2014, from the Korean Intellectual Property Office in counterpart Korean Application No. 10-2013-7023734.

Communication dated May 1, 2015 from the Korean Intellectual Property Office in counterpart application No. 10-20137023734.

Communication dated May 5, 2015 from the State Intellectual Property Office of People's Republic of China in counterpart Application No. 201280009386.1.

DATA TRANSFER DEVICE

CROSS REFERENCE TO RELATED APPLICATIONS

This application is a National Stage of International Application No. PCT/JP2012/053363 filed Feb. 14, 2012, claiming priority based on International Application No. PCT/JP2011/053249 filed Feb. 16, 2011, the contents of all of which are incorporated herein by reference in their entirety.

FIELD

The present invention relates to a data transfer device that collects control data related to an FA (Factory Automation) system and transfers the control data to a high-order device.

BACKGROUND

A configuration in which an FA system is caused to have a data transfer device to collect control data related to the FA system such as device data of a programmable controller (hereinafter, simply referred to as "PLC") using the data transfer device has been often adopted (see, for example, Patent Literature 1 and Patent Literature 2). The data transfer device transfers collected control data to a high-order device such as a host computer. Users can use the control data transferred to the high-order device for applications such as confirming operating conditions of the FA system and monitoring errors.

CITATION LIST

Patent Literatures

Patent Literature 1: Japanese Patent Application Laid-open No. 2003-114908
Patent Literature 2: Japanese Patent Application Laid-open No. 2006-215999

SUMMARY

Technical Problem

In recent years, there is a demand to acquire device data in the PLC on a real-time basis. Furthermore, depending on a scale of a user program, control data expected to acquire may have a huge size. In the PLC, because the device data are updated at a very high speed (for example, in the order of milliseconds), the data transfer device needs to collect device data updated sequentially at a cycle corresponding to an update interval and transfer the collected device data as soon as possible after completion of collection, in order to acquire a large volume of device data for the host computer on a real-time basis.

Generally, in the data transfer device used in the FA system, a polling communication method is adopted as a data transfer method. However, according to this method, an overhead for transmitting a data transfer request is large, and as a result, a data transfer interval becomes long (for example, in the order of 100 milliseconds), the efficiency of data transfer is low, and the host computer cannot acquire the device data on a real-time basis.

The present invention has been achieved in view of the above-mentioned circumstances, and an object thereof is to provide a data transfer device that can collect control data related to an FA system at as short a cycle as possible and can transfer the collected control data to a high-order device at a high speed.

Solution to Problem

In order to solve the above-mentioned problems and achieve the object, the present invention provides a data transfer device comprising: a collection-interval storage unit that stores therein a collection interval set by a high-order device; a data collection unit that reads a collection interval stored in the collection-interval storage unit and collects control data related to an FA system at the read collection interval; a transfer-interval storage unit that stores therein a transfer interval set by the high-order device, which is equal to or larger than the collection interval stored in the collection-interval storage unit; a temporary storage unit that accumulates and stores therein the control data collected by the data collection unit; and a data transferring unit that reads a transfer interval stored in the transfer-interval storage unit, and collectively transfers control data collected by the data collection unit, which is accumulated and stored in the temporary storage unit, at the read transfer interval to the high-order device.

Advantageous Effects of Invention

The data transfer device according to the present invention can collect control data related to an FA system at as short a cycle as possible and transfer the collected control data to a high-order device at a high speed.

DESCRIPTION OF EMBODIMENTS

Exemplary embodiments of data transfer devices according to the present invention will be explained below in detail with reference to the drawings. The present invention is not limited to the embodiments.

First Embodiment

Figure 1:
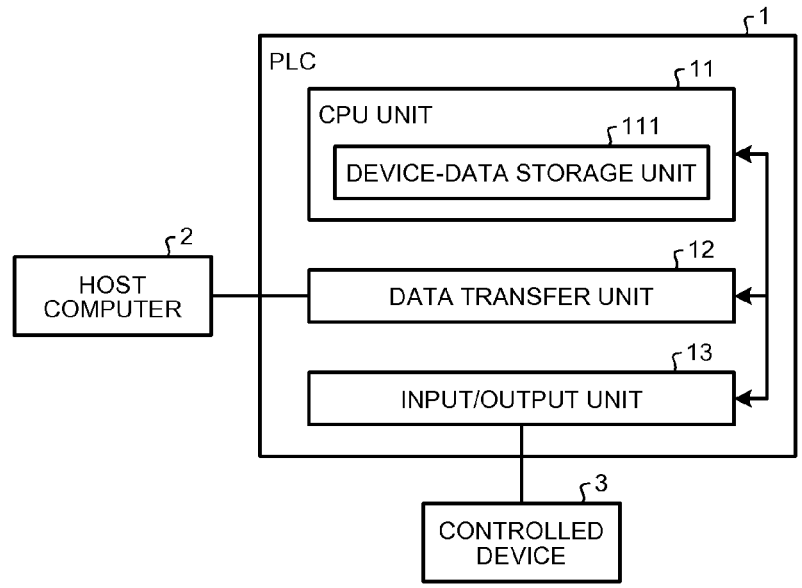
FIG. 1 is an explanatory diagram of a configuration example of an FA system using a data transfer device according to a first embodiment.

FIG. 1 is an explanatory diagram of a configuration example of an FA system using a data transfer device according to a first embodiment of the present invention. As shown in FIG. 1, the FA system includes a PLC 1, a host computer 2, and a controlled device 3. The PLC 1 controls the controlled device 3 based on a user program created beforehand. The controlled device 3 can be of any type; however, for example, a robot or a servo amplifier corresponds thereto. Another PLC different from the PLC 1 can be connected to the PLC 1 as the controlled device 3, and another controlled device can be further connected thereto via the PLC as the controlled device 3.

The PLC 1 uses a state machine that models after a relay circuit as an operation model, and the previously-mentioned user program is generally described using a programming language in which a relay circuit is encoded. The PLC 1 sequentially updates device data by which a contact point of an input/output relay or an internal relay is modeled by repeatedly executing the user program. The PLC 1 controls the controlled device 3 using the device data corresponding to the contact point of the input/output relay between the controlled device 3 and the PLC 1. As the PLC, there is a type capable of executing advanced computing such as a trigonometric function by executing the user program described using a high-level language such as the C language. However, the embodiments of the present invention can be applied to any type of PLCs that sequentially update the device data.

The PLC 1 includes a CPU unit 11, a data transfer unit 12 as the data transfer device, and an input/output unit 13. The CPU unit 11, the data transfer unit 12, and the input/output unit 13 are connected to each other via a bus.

The CPU unit 11 has a device-data storage unit 111 that stores device data therein, and sequentially updates the device data stored in the device-data storage unit 111 by executing the user program.

The input/output unit 13 is a collective term for a unit that transmits the corresponding device data of the device data stored in the device-data storage unit 111 to the controlled device 3, a unit that generates command data for controlling the controlled device 3 while processing the corresponding device data and transmits the command data to the controlled device 3, and a unit that updates the device data with output data outputted by the controlled device 3 or processed output data acquired by processing the output data. An appropriate unit is selected and used depending on the type of the controlled device 3. For example, when a temperature sensor is provided for the controlled device 3 and it is desired to input temperature information from the temperature sensor, a temperature input unit is selected. When the controlled device 3 is a servo amplifier and it is desired to output a position command to the servo amplifier, a positioning unit is selected.

The data transfer unit 12 is connected to the host computer 2 via a communication line, and collects the device data stored in the device-data storage unit 111 and transfers the collected device data to the host computer 2 via the communication line. The communication line can be based on any protocol. However, it is assumed herein that the communication line complies with the Ethernet®, and a communication system via that communication line compileds with TCP/IP.

Figure 2:
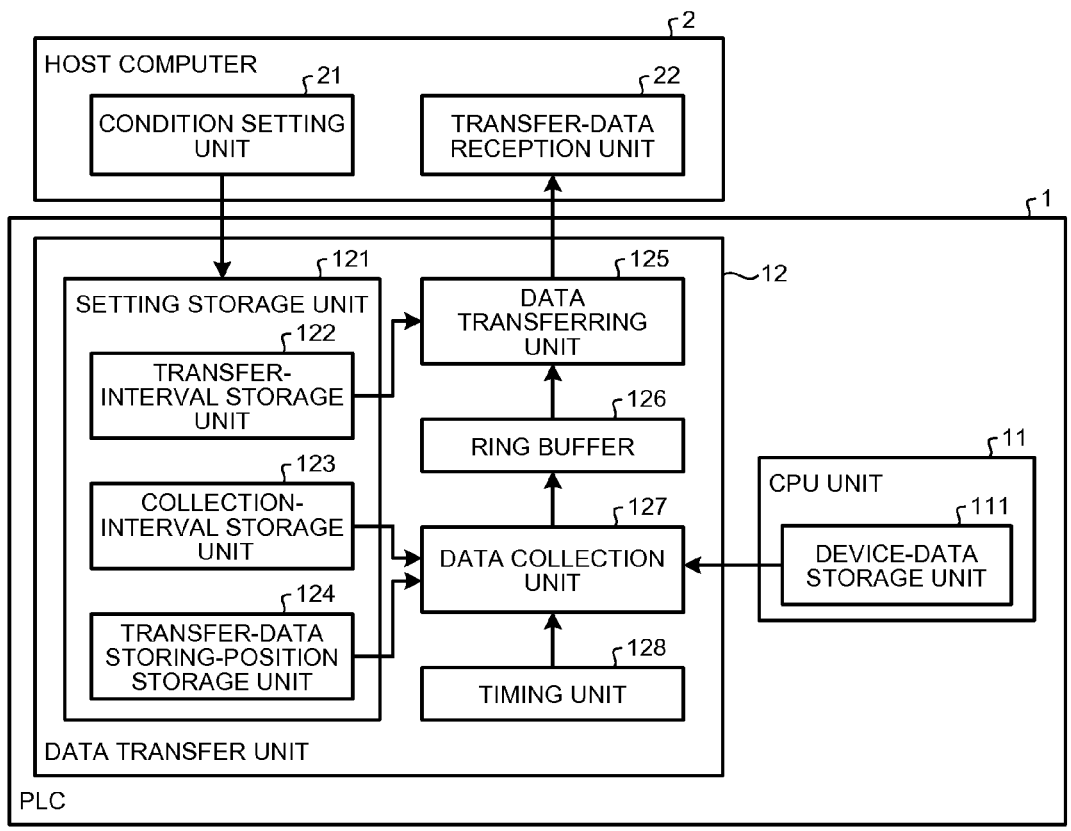
FIG. 2 is an explanatory diagram of a functional configuration of a data transfer unit according to the first embodiment.

FIG. 2 is an explanatory diagram of a functional configuration of the data transfer unit according to the first embodiment of the present invention. As shown in FIG. 2, the data transfer unit 12 includes a setting storage unit 121, a data transferring unit 125, a ring buffer 126, a data collection unit 127, and a timing unit 128. The host computer 2 includes a condition setting unit 21 that performs condition setting related to collection and transfer of device data for the data transfer unit 12, and a transfer-data reception unit 22 that receives the transfer data transferred from the data transfer unit 12.

The setting storage unit 121 is constituted by a storage device such as a register or a memory, for example, and stores therein various conditions set by the condition setting unit 21. Specifically, the setting storage unit 121 includes a collection-interval storage unit 123 that stores therein a collection interval of the device data, a transfer-interval storage unit 122 that stores therein a transfer interval of the collected device data, and a transfer-data storing-position storage unit 124 that stores therein a storing position (address) of the device data to be collected. The collection interval of the device data is expressed by, for example, the amount of time of the collection interval or the number of scans of the user program each corresponding to the collection interval. The transfer interval of the data transfer is expressed by, for example, the amount of time of the transfer interval or the number of collections of the device data corresponding to the transfer interval. The transfer interval having a value equal to or larger than the collection interval stored in the collection-interval storage unit 123, when being calculated in terms of the amount of time, is stored in the transfer-interval storage unit 122. It can be configured such that the storing position of the device data is addressed by the name of the device data stored in the corresponding storing position.

The timing unit 128 is a counter that outputs the present time.

The data collection unit 127 acquires the storing position and the collection interval of the transfer data from the transfer-data storing-position storage unit 124 and the collection-interval storage unit 123, respectively, and collects the device data at the collection interval set in the collection-interval storage unit 123 from the storing position set in the transfer-data storing-position storage unit 124 in the device-data storage unit 111. That is, because the data collection unit 127 regularly collects control data related to the FA system, without any request each time from the host computer 2, the device data can be collected at a cycle shorter than in a case of collecting the device data, waiting for a request from the host computer 2. The data collection unit 127 stores the collected device data in the ring buffer 126.

The data collection unit 127 acquires the present time from the timing unit 128 every time when collecting the device data, and adds the acquired present time to the collected device data. When a plurality of storing positions have been set in the transfer-data storing-position storage unit 124, the data collection unit 127 acquires the device data, respectively, from the set storing positions. In this manner, when a plurality of device data elements are to be acquired in one collection, the data collection unit 127 gives one present time to the acquired device data elements. A device data group acquired by one collection is expressed as "collection data".

The ring buffer 126 is constituted by a storage device such as a register or a memory, and functions as a temporary storage unit that accumulates and stores therein device data that are collected by the data collection unit 127 and that are not yet transferred to the transfer-data reception unit 22 by the data transferring unit 125 described later. The configuration of the storage device that realizes the function as the temporary storage part is not limited to the ring buffer configuration.

The data transferring unit 125 reads all the collection data elements accumulated and memorized in the ring buffer 126, which have not been transferred yet, at the transfer interval set in the transfer-interval storage unit 122, and transmits the read collection data elements to the transfer-data reception unit 22 in one packet in a lump (in other words, collectively).

Figure 3:
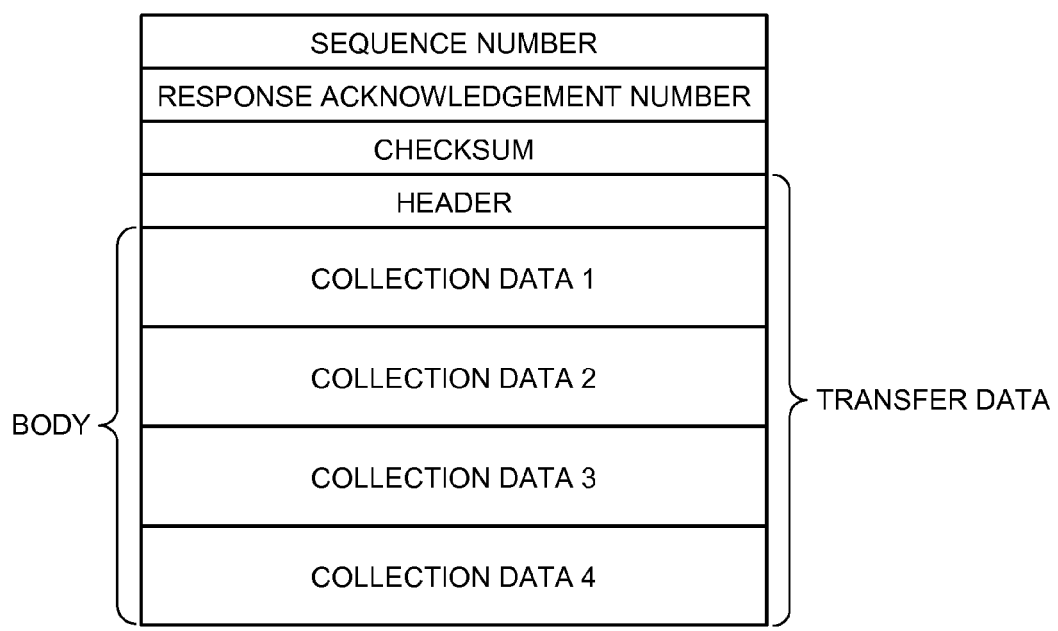
FIG. 3 is an explanatory diagram of an outline of a configuration of a packet related to transfer data transmitted by a data transferring unit.

FIG. 3 is an explanatory diagram of an outline of a configuration of a packet related to transfer data transmitted by the data transferring unit 125. As shown in FIG. 3, the packet is configured to include a sequence number, a response acknowledgement number (ACK number), a checksum, and transfer data.

The transfer data are composed of a header and a body consisting of device data (collection data) acquired from the ring buffer 126. The body of the transfer data includes four collection data elements (collection data elements 1 to 4), and each collection data element includes one or more device data collected from the device-data memory unit 111 by one collection. The size per one collection data element (for example, the number of words), the number of collection data elements included in the body, and the like are described in the header, and the header is generated by the data transferring unit 125. When the number of collection data elements or the size of one collection data element is larger than a predetermined size data of which can be transmitted in one packet, the data transferring unit 125 divides the transfer data into a plurality of packets to transmit the respective packets.

The sequence number is a number indicating at which position the head of the transfer data added thereto is positioned in the transfer data to be transferred in a series of packets. The response acknowledgement number is a sequence number expected in a packet to be received next, which is set for a packet (ACK packet) to be transmitted as a response to the former packet by a reception side of the former packet.

For example, when the transfer-data reception unit 22 completes reception of a packet having a sequence number that is 100 and including 300 bytes transfer data, the transfer-data reception unit 22 returns a packet having a response acknowledgement number of 400. The data transferring unit 125 can recognize that transmission of the 300 bytes transfer data has been successfully completed by confirming that the value obtained by subtracting the sequence number of 100 of the packet sent at the last minute from the response acknowledgement number matches with 300 that is the number of bytes of the transmitted transfer data. The data transferring unit 125 can transmit a packet including the next transfer data with adding a sequence number of 400 to the packet.

The checksum is a checksum value calculated for the packet including the transfer data. The reception side performs error check of the transfer data by checking the checksum value calculated from the packet against the checksum value described in the packet.

Figure 4:
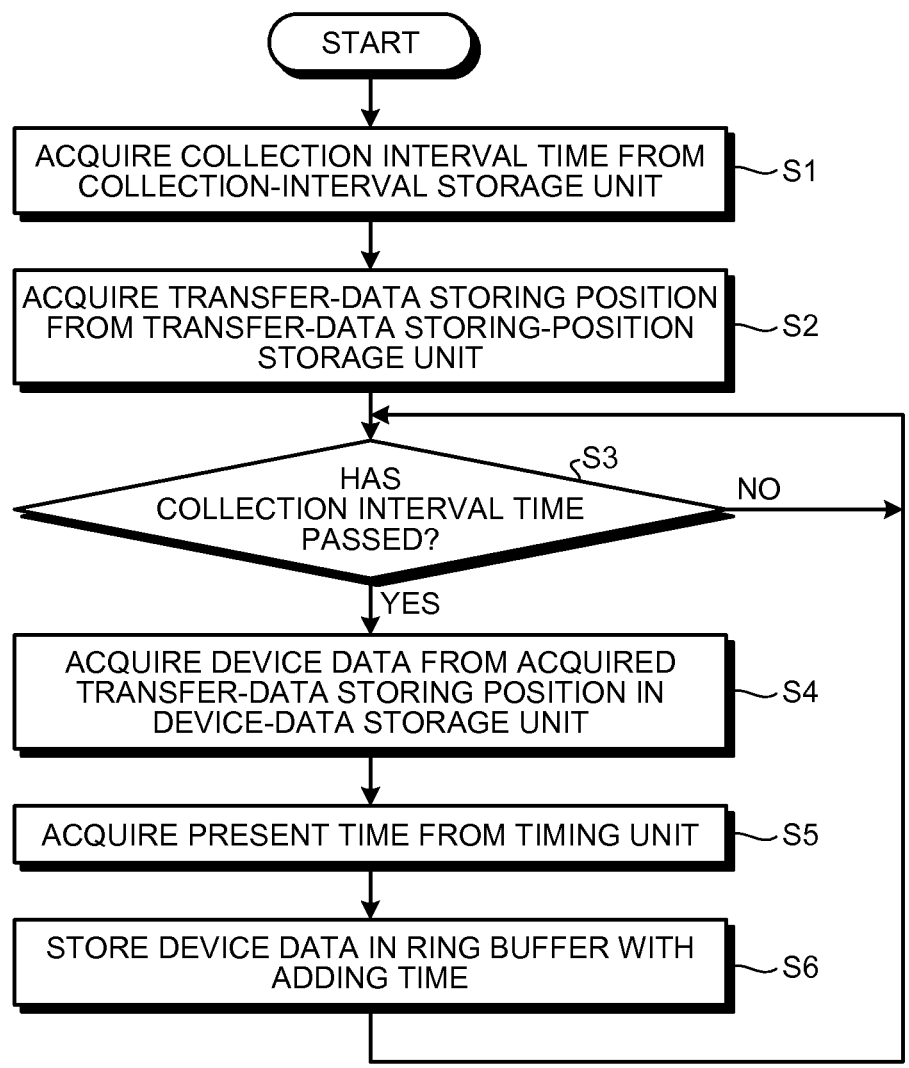
FIG. 4 is a flowchart for explaining an operation of a data collection unit.

An operation of the data transfer unit 12 according to the first embodiment is explained with reference to FIGS. 4 to 7. FIG. 4 is a flowchart for explaining an operation of the data collection unit 127.

As shown in FIG. 4, when the data transfer unit 12 is to start data transfer, the data collection unit 127 first acquires a collection interval from the collection-interval storage unit 123 (Step S1). It is assumed here that the collection interval is set by time. Next, the data collection unit 127 acquires a storing position of the transfer data to be transferred from the transfer-data storing-position storage unit 124 (Step S2). The performing order of the processes at Steps S1 and S2 is not limited to this manner.

Subsequently, after starting the operation or after performing an operation at Step S4 described later, the data collection unit 127 determines whether or not the time set as the collection interval in the collection-interval storage unit 123 (collection interval time) has passed (Step S3). When the collection interval time has not passed yet (NO at Step S3), the data collection unit 127 performs determination of Step S3 again.

When the collection interval time has passed (YES at Step S3), the data collection unit 127 acquires the device data to be transferred from a position corresponding to the storing position set in the transfer-data storing-position storage unit 124 in the device-data storage unit 111 (Step S4). When a plurality of storing positions have been set, the data collection unit 127 acquires the device data from positions corresponding to the set storing positions.

It is described here that the data collection unit 127 directly acquires the device data from the device-data storage unit 111, but the data collection unit 127 and the CPU unit 11 may be configured such that the data collection unit 127 notifies the CPU unit 11 of a storing position of the device data, and the CPU unit 11 transmits the device data stored at the storing position obtained by the notification to the data collection unit 127. The data collection unit 127 and the CPU unit 11 may also be configured such that the data collection unit 127 notifies the CPU unit 11 of a storing position and a collection cycle, and the CPU unit 11 transmits the device data stored at the storing position obtained by the notification to the data collection unit 127 at the collection cycle obtained by the notification.

After having performed the process of Step S4, the data collection unit 127 acquires the present time from the timing unit 128 (Step S5), and stores the device data acquired by the process of Step S4 in the ring buffer 126 with the time acquired by the process of Step S5 being added to the device data (Step S6). After having performed the process of Step S6, the data collection unit 127 proceeds to Step S3 to perform the determining process of Step S3.

Figure 5:
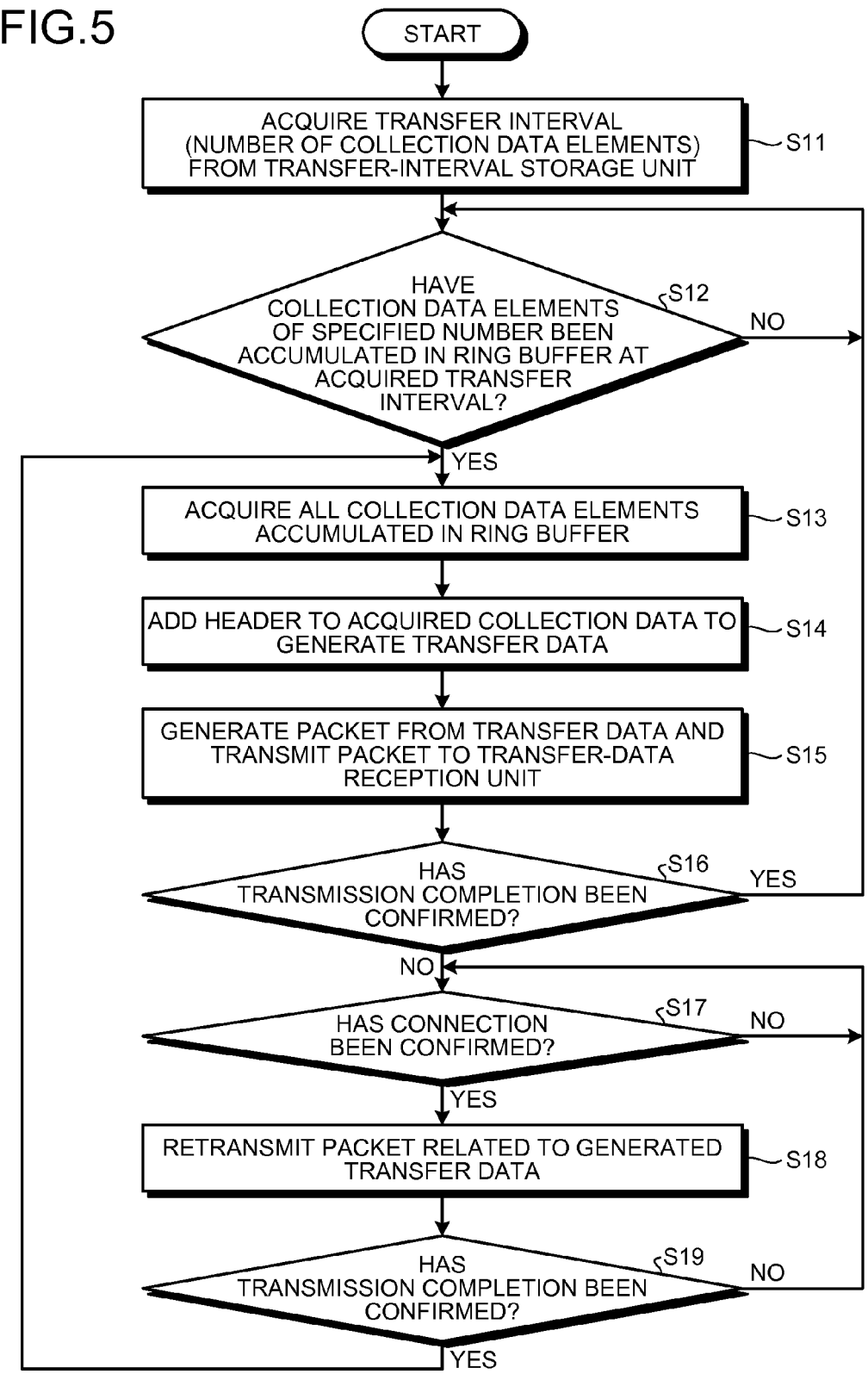
FIG. 5 is a flowchart for explaining an operation of a data transferring unit.

FIG. 5 is a flowchart for explaining an operation of the data transferring unit 125. As shown in FIG. 5, when the data transfer unit 12 is to start data transfer, the data transferring unit 125 acquires a transfer interval from the transfer-interval storage unit 122 (Step S11). It is assumed here that the transfer interval is specified by the number of collection data elements.

The data transferring unit 125 then determines whether or not the collection data elements for the number set as the transfer interval in the transfer-interval storage unit 122, which have not been transferred yet, are accumulated in the ring buffer 126 (Step S12). When the untransferred collection data elements for the set number are not accumulated therein (NO at Step S12), the data transferring unit 125 performs the determining process of Step S12 again.

When the collection data elements for the set number are accumulated in the ring buffer 126 (YES at Step S12), the data transferring unit 125 acquires all the untransferred data of the collection data elements accumulated in the ring buffer 126 (Step S13), and adds a header to the acquired collection data to generate transfer data (Step S14). Furthermore, the data transferring unit 125 adds a sequence number and the like to the generated transfer data, thereby generating a packet related to the transfer data, and transmits the packet to the transfer-data reception unit 22 (Step S15).

The data transferring unit 125 determines whether or not transmission of the packet has been successfully completed by the process of Step S15 (Step S16). Specifically, the data transferring unit 125 receives an ACK packet from the transfer-data reception unit 22 to confirm whether or not the transfer data has been successfully transmitted based on the response acknowledgement number described in the received ACK packet. When it is confirmed that the transfer data have been successfully transmitted, the data transferring unit 125 determines that transmission completion can be confirmed (YES at Step S16), and proceeds to Step S12 to perform the determining process of Step S12.

After Step S15, when a time-out time has passed without receiving the ACK packet, or when it can be confirmed that the transfer data has not been successfully transmitted based on the response acknowledgement number with reception of the ACK packet, the data transferring unit 125 determines that transmission completion cannot be confirmed (NO at Step S16), and confirms whether connection with the transfer-data reception unit 22 has been established (Step S17). When establishment of the connection cannot be confirmed due to disconnection of the communication line or the like (NO at Step S17), the data transferring unit 125 performs the determining process of Step S17, until establishment of the connection can be confirmed.

When establishment of the connection can be confirmed (YES at Step S17), the data transferring unit 125 retransmits the packet generated by the process of Step S15 (Step S18). The data transferring unit 125 then confirms transmission completion by a same process similar to that of Step S16 (Step S19). When transmission completion can be confirmed (YES at Step S19), the data transferring unit 125 proceeds to Step S13, to perform the process of Step S13. When transmission completion cannot be confirmed (NO at Step S19), the data transferring unit 125 proceeds to Step S17, to perform the determining process of Step S17.

In the explanation for Step S18, it has been explained that the data transferring unit 125 simply retransmits the packet. However, when transmission completion can be confirmed in the determining process at Step S16 or S19, the data transferring unit 125 may erase the data acquired from the ring buffer 126, and may acquire the device data from the ring buffer 126 again at Step S18 to regenerate the packet from the acquired device data.

Figure 6:
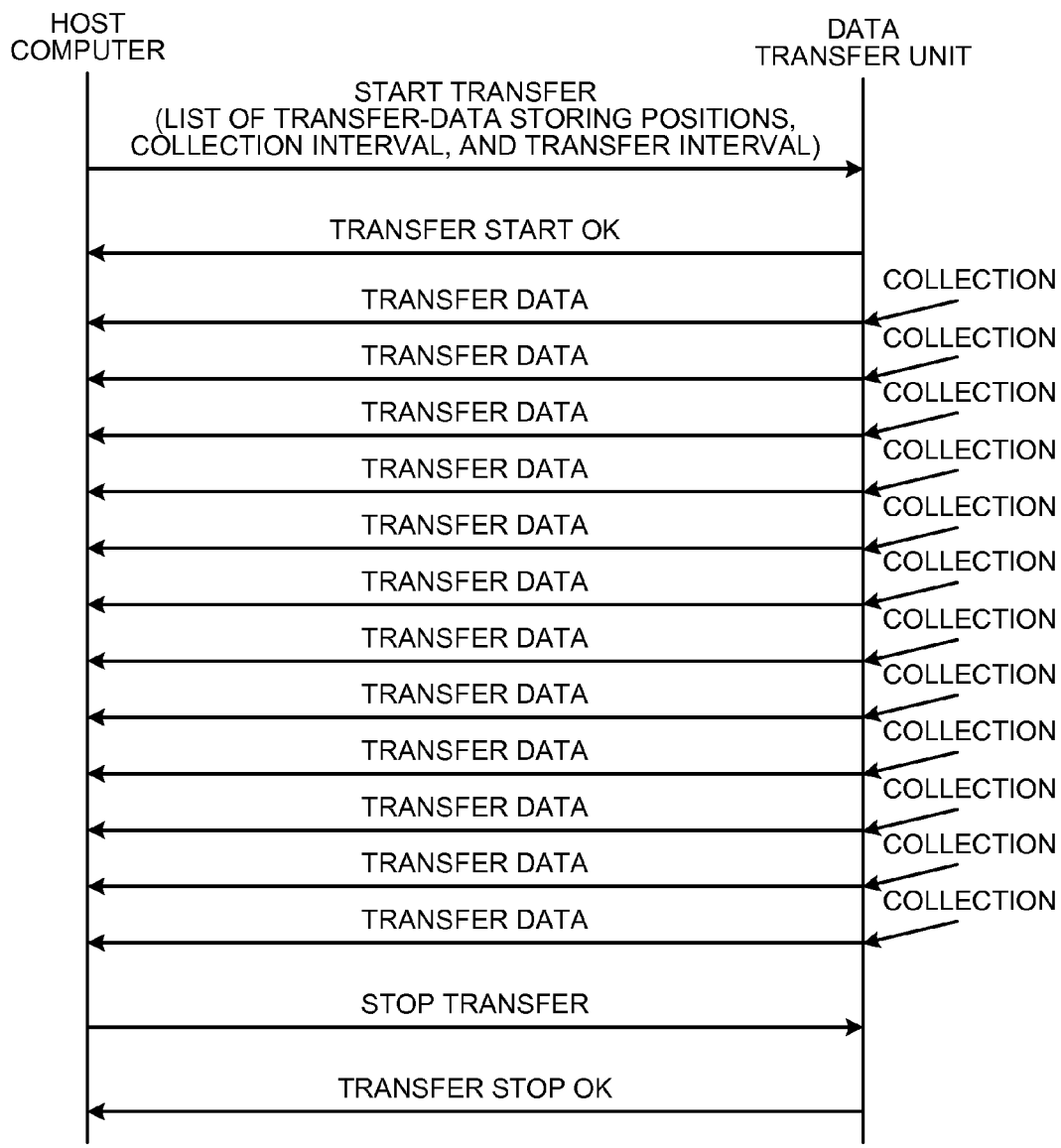
FIG. 6 is a timing chart for explaining transmission and reception timing of data transfer between a host computer and a data transfer unit.
Figure 7:
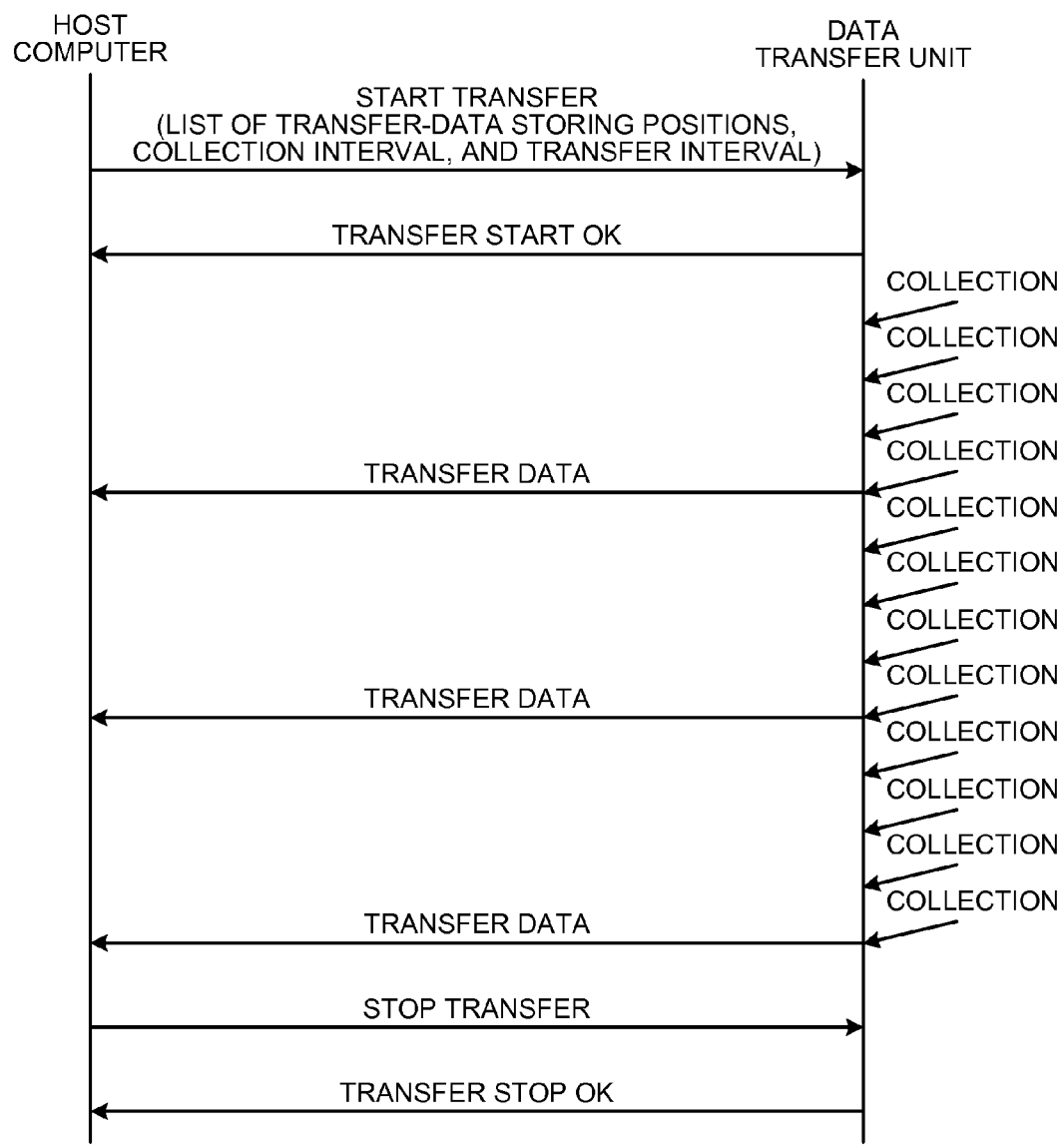
FIG. 7 is a timing chart for explaining transmission and reception timing of data transfer between a host computer and a data transfer unit.

FIG. 6 is a timing chart for explaining transmission and reception timing of data transfer between the host computer 2 and the data transfer unit 12 when the number of collection data elements "1" is set as the transfer interval. FIG. 7 is a timing chart for explaining transmission and reception timing of data transfer when the number of collection data elements "4" is set as the transfer interval. In FIGS. 6 and 7, transfer of the ACK packet is not shown.

Figure 8:
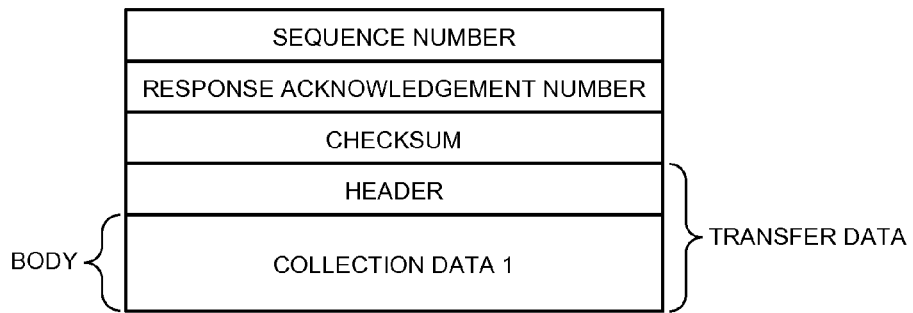
FIG. 8 is an explanatory diagram of an outline of a configuration of a packet related to transfer data transmitted by the data transferring unit.

When the collection interval is "1", as shown in FIG. 6, the host computer 2 transmits a list of storing positions of the transfer data, the collection interval, and the transfer interval "1" as a transfer start command. The command is transmitted by the condition setting unit 21. The data transfer unit 12 then stores the transmitted various conditions respectively in the corresponding storage units 122 to 124 in the setting storage unit 121, and returns a response of "transfer start OK". Thereafter, the data transfer unit 12 executes data transfer whenever the device data are collected, in cooperation with the data collection unit 127 and the data transferring unit 125. When the host computer 2 transmits a transfer stop command, the data transfer unit 12 stops the data transfer, and returns a response of "transfer stop OK". When the collection interval is "1", as shown in FIG. 8, a packet including one collection data element is transmitted as a packet related to the transfer data.

When the collection interval is "4", as shown in FIG. 7, the host computer 2 first transmits a list of storing positions of the transfer data, the collection interval, and the transfer interval "4" as a transfer start command. The data transfer unit 12 then stores the transmitted various conditions respectively in the corresponding storage units 122 to 124 in the setting storage unit 121 and returns a response of transfer start OK. Thereafter, the data transfer unit 12 generates the packet shown in FIG. 3 whenever four device data elements are collected, and transmits the packet to the host computer 2, in cooperation with the data collection unit 127 and the data transferring unit 125. When the host computer 2 transmits a transfer stop command, the data transfer unit 12 stops data transfer, and returns a response of transfer stop OK.

The host computer 2 performs check of the checksum and transmission of the ACK packet whenever a packet related to the transfer data is received. Accordingly, as the number of collection data elements included in one packet gets smaller, an overhead required for check of the checksum and transmission of the ACK packet relatively increases, and as a result a load put on the host computer 2 increases. At the time of setting the various conditions from the host computer 2, users can set the collection interval, taking the performance of the host computer 2 into consideration.

The host computer 2 may be configured to be able to change the collection interval automatically based on a predetermined rule, based on various conditions such as the load required for the transfer and the received device data.

Figure 12:
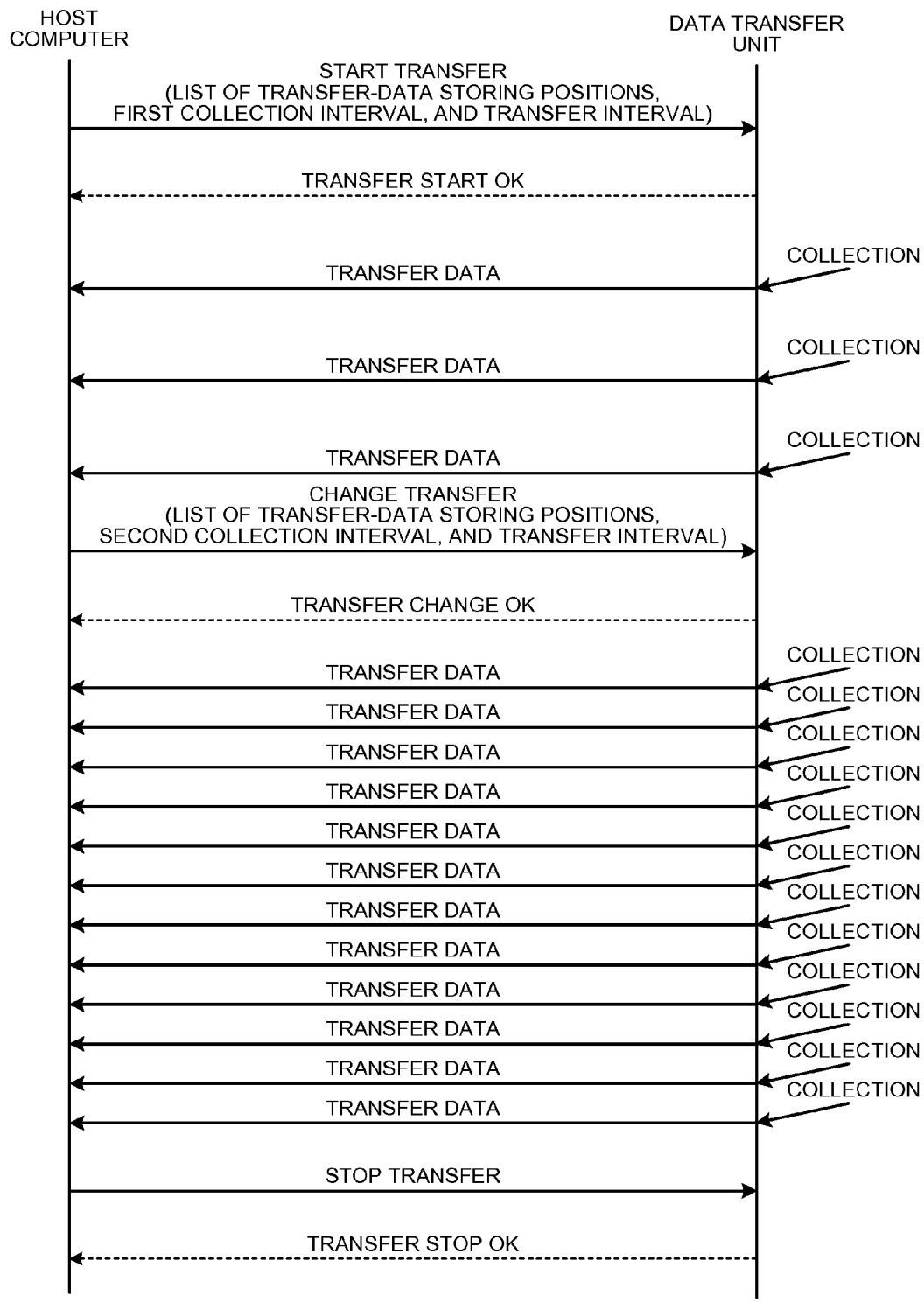
FIG. 12 is a flowchart for explaining transmission and reception timing of data transfer between a host computer and a data transfer unit.

FIG. 12 is a timing chart for explaining transmission and reception timing of data transfer between the host computer 2 and the data transfer unit 12, when the number of collection data elements "1" is set as the transfer interval, and the collection interval is changed from a first collection interval to a second collection interval shorter than the first collection interval, in the middle of the transfer. In FIG. 12, transfer of the ACK packet is not shown.

First, as shown in FIG. 12, the host computer 2 transmits a list of storing positions of the transfer data, the first collection interval, and the transfer interval "1" as a transfer start command. The data transfer unit 12 then stores the transmitted various conditions respectively in the corresponding storage units 122 to 124 in the setting storage unit 121 and returns a response of "transfer start OK". Thereafter, the data collection unit 127 reads the first collection interval from the collection-interval storage unit 123 and the storing position of the transfer data to be transferred from the transfer-data storing-position storage unit 124, respectively, and the data transferring unit 125 reads the transfer interval from the transfer-interval storage unit 122. The data transfer unit 12 then generates the packet shown in FIG. 8 whenever the device data are collected at the first collection interval, and transmits the packet to the host computer 2, in cooperation with the data collection unit 127 and the data transferring unit 125.

When the transfer-data reception unit 22 of the host computer 2 analyzes the device data in the transferred packet and determines that it is desired to acquire the device data at a shorter cycle, the transfer-data reception unit 22 notifies the condition setting unit 21 to transfer the packet at a shorter cycle. The condition setting unit 21 transmits the list of storing positions of the same transfer data, the second collection interval, and the same transfer interval "1" as a transfer change command.

The data transfer unit 12 then stores the transmitted various conditions respectively in the corresponding storage units 122 and 123 in the setting storage unit 121 and returns a response of transfer change OK. Accordingly, various kinds of information in the storage units 122 and 123 are updated. Thereafter, the data collection unit 127 reads the second collection interval from the collection-interval storage unit 123 and the storing position of the transfer data to be transferred from the transfer-data storing-position storage unit 124, respectively, and the data transferring unit 125 reads the transfer interval from the transfer-interval storage unit 122. Then, the data transfer unit 12 generates the packet shown in FIG. 8 whenever the device data are collected at the second collection interval, and transmits the packet to the host computer 2, in cooperation with the data collection unit 127 and the data transferring unit 125.

In FIG. 12, the transfer command to change the collection interval is described. However, the transfer command may be arranged to change the list of storing positions of the transfer data or the transfer interval. The transfer-data reception unit 22 analyzes the device data in the transferred packet and notifies the condition setting unit 21 to transfer the packet at a shorter cycle. However, the transfer-data reception unit 22 may notify the condition setting unit 21 to change the cycle based on the present time without analyzing the device data. That is, the host computer 2 can update the transfer interval, the collection interval, or the storing position of the transfer data to be transferred according to any rule. Furthermore, aside from the configuration in which the host computer 2 automatically updates the transfer interval, the collection interval, or the storing position of the transfer data to be transferred, a user may operate the host computer 2 to update the transfer interval, the collection interval, or the storing position of the transfer data to be transferred in desired timing.

As described above, according to the first embodiment of the present invention, the configuration has the data collection unit 127 that regularly collects device data without any request each time from the host computer 2 as a high-order device, the data transferring unit 125 that transfers the device data collected by the data collection unit 127 to the host computer 2, the transfer-interval storage unit 122 that stores therein the transfer interval set by the host computer 2, which is equal to or larger than the collection interval of the device data by the data collection unit 127, and the ring buffer 126 as the temporary storage unit that accumulates and stores therein the device data that are collected by the data collection unit 127 and have not been transferred to the host computer 2 by the data transferring unit 125. The data transferring unit 125 transfers the device data accumulated and stored in the ring buffer 126 collectively to the host computer at the transfer interval set in the transfer-interval storage unit 122. Accordingly, the device data can be collected at as short a cycle as possible, and the collected control data can be transferred to the host computer 2 at a high speed. Therefore, the user can confirm the device data on a real-time basis using the host computer 2, by setting the collection interval equivalent to an update interval of the device data and setting the transfer interval equal to the collection interval. Furthermore, the user can reduce the overhead required for data transfer of the transfer data by setting the transfer interval larger than the collection interval.

Further, after transferring the device data to the host computer 2, the data transferring unit 125 determines whether or not the host computer 2 has received the transferred device data. When the host computer 2 has not received the device data, the data transferring unit 125 retransmits the device data after connection with the host computer 2 has been established. Accordingly, even if the network between the data transfer unit 12 and the host computer 2 is temporarily disconnected, the device data can be retransmitted.

The collection-interval storage unit 123 that stores therein the collection interval is further provided, and the data collection unit 127 collects the device data at the collection interval set in the collection-interval storage unit 123. Accordingly, the user can collect the device data at a desired interval.

Furthermore, the transfer-data storing-position storage unit 124 that stores therein the storing position of the device data to be transferred in the device-data storage unit 111 is provided, and the data collection unit 127 collects the device data stored at the storing position set in the transfer-data storing-position storage unit 124. Accordingly, the user can collect the desired device data.

Further, when the collection interval stored in the collection-interval storage unit 123 is updated by the condition setting unit 21, the data collection unit 127 reads the updated collection interval, and changes the interval at which the transfer data are collected to the read updated collection interval. Accordingly, the user can dynamically change the collection interval, without stopping data transfer.

When the storing position stored in the transfer-data storing-position storage unit 124 is updated by the condition setting unit 21, the data collection unit 127 reads the updated storing position, and changes the storing position of the transfer data to be transferred to the updated storing position. Accordingly, the user can dynamically change the device data to be transferred without stopping data transfer.

When the transfer interval stored in the transfer-interval storage unit 122 is updated by the condition setting unit 21, the data transferring unit 125 reads the updated transfer interval, and changes the interval at which the transfer data are transferred to the read updated transfer interval. Accordingly, the user can dynamically change the transfer interval of the transfer data without stopping data transfer.

The transfer-data reception unit 22 issues a notification to change the collection interval, the transfer interval, or the storing position of the transfer data to be transferred to the condition setting unit 21, based on a predetermined rule. The condition setting unit 21 then updates the setting of the collection interval, the transfer interval, or the storing position of the transfer data to be transferred based on the notification. Accordingly, setting of the collection interval, the transfer interval, or the storing position of the transfer data to be transferred can be automatically changed, without stopping data transfer.

Second Embodiment

Figure 9:
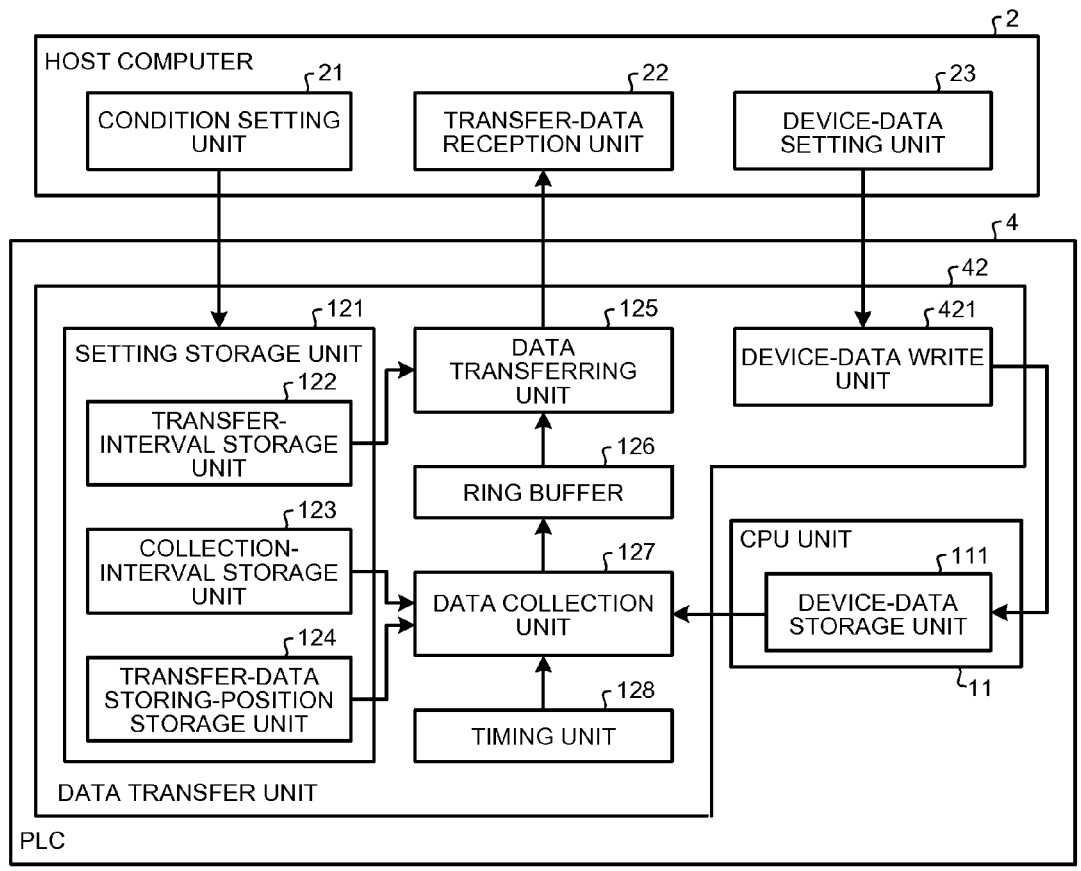
FIG. 9 is an explanatory diagram of a functional configuration of a data transfer unit according to a second embodiment.

FIG. 9 is an explanatory diagram of a functional configuration of a data transfer unit according to a second embodiment of the present invention. A reference sign 42 denotes the data transfer unit according to the second embodiment, and a reference sign 4 denotes the PLC including the data transfer unit 42, respectively, to distinguish these elements from those of the first embodiment. Constituent elements having functions identical to those of the first embodiment are denoted by the same reference signs as in the first embodiment, and detailed explanations thereof will be omitted.

As shown in FIG. 9, the PLC 4 includes the data transfer unit 42 and the CPU unit 11. Although not shown in FIG. 9, the PLC 4 also includes the input/output unit 13 as in the first embodiment, to control the controlled device 3 via the input/output unit 13.

The data transfer unit 42 includes the setting storage unit 121, the data transferring unit 125, the ring buffer 126, the data collection unit 127, the timing unit 128, and a device-data write unit 421. The setting storage unit 121 further includes the transfer-interval storage unit 122, the collection-interval storage unit 123, and the transfer-data storing-position storage unit 124.

The host computer 2 includes the condition setting unit 21, the transfer-data reception unit 22, and a device-data setting unit 23. A user can set the device data in the CPU unit 11 using the device-data setting unit 23.

Upon reception of a setting command of device data from the device-data setting unit 23, the device-data write unit 421 sets the device data in the device-data storage unit 111 provided in the CPU unit 11, based on the received setting command. The setting command of the device data includes, for example, a storing position of the device data to be set and a setting content. That is, the device-data write unit 421 performs an operation of rewriting the device data at the specified storing position with the specified setting content.

For example, in a line of performing an exposure process of a semiconductor integrated circuit, defect inspection is performed appropriately for wafers on the line. At the time of a normal operation, a user causes the data collection unit 127 to collect device data, respectively, from an address at which a lot number, a defect inspection result, and measurement values (a gas temperature and an exposure amount) related to a process condition are stored, and causes the data transferring unit 125 to transfer the collected device data to the host computer 2 sequentially, thereby enabling to monitor the defect inspection result and various measurement values for each lot. Furthermore, according to the second embodiment of the present invention, when an abnormality is detected on the line by monitoring the various kinds of data, the user can change the process condition as desired by transmitting a setting command to the device-data write unit 421.

As described above, according to the second embodiment, the configuration is further provided with the device-data write unit 421 that receives a setting command of device data transmitted from the host computer 2 to update the device data stored in the device-data storage unit 111 based on the received setting command. Accordingly, the user can feeds back the check result of the operating condition based on the device data transferred to the host computer 2 to the FA system.

Third Embodiment

Figure 10:
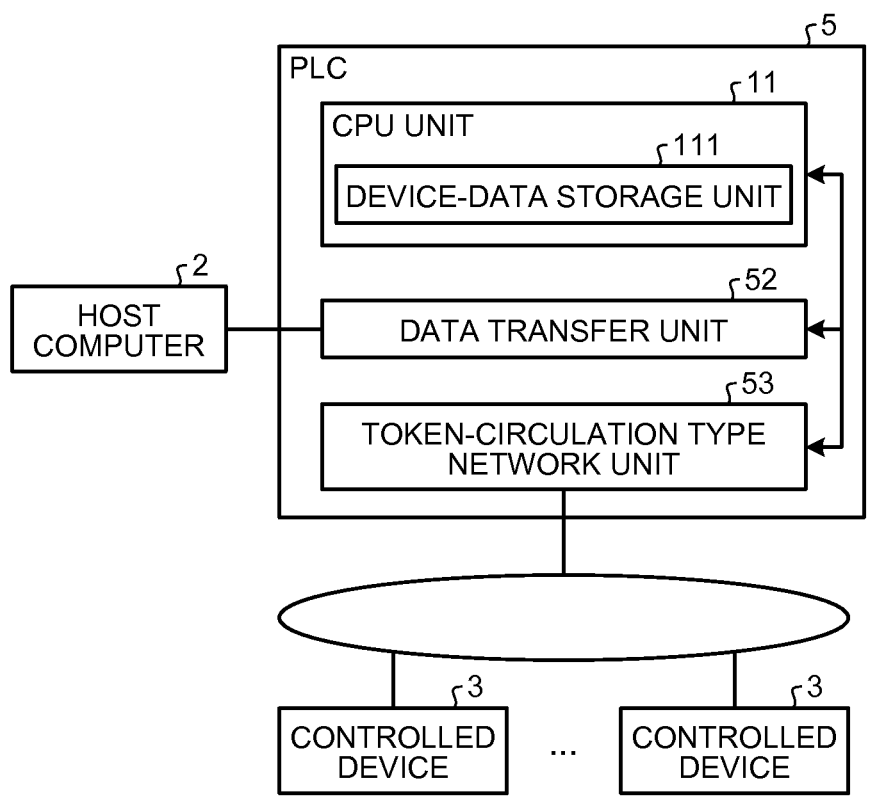
FIG. 10 is an explanatory diagram of a configuration example of an FA system using a data transfer unit according to a third embodiment.

FIG. 10 is an explanatory diagram of a configuration example of an FA system using a data transfer unit according to a third embodiment of the present invention. As shown in FIG. 10, the FA system includes a PLC 5, the host computer 2, and a plurality of controlled devices 3. The PLC 5 and the controlled devices 3 are respectively connected to each other by a network adopting a token-circulation type communication system, and the PLC 5 functions as a host device for the network. The token-circulation type communication system means a communication system, in which a shared memory for communication is provided in each device over the network and a unique token is circulated on the network, and only the device holding the token can be eligible for writing of the shared memory, which corresponds to, for example, CC-Link IE. In the present embodiment, transmission and reception of control data is performed between each controlled device 3 and the PLC 5 via the shared memory.

The PLC 5 includes the CPU unit 11 including the device-data storage unit 111, a data transfer unit 52 as a data transfer device according to the third embodiment, and a token-circulation type network unit 53.

The token-circulation type network unit 53 is an interface unit for connecting the controlled device 3 and the PLC 5 to each other by the token-circulation type network described above, and circulates a token based on a command from the CPU unit 11. The token-circulation type network unit 53 transmits control data in the shared memory to the data transfer unit 52 whenever the token is returned.

The data transfer unit 52 transfers the control data received from the token-circulation type network unit 53 to the host computer 2.

Figure 11:
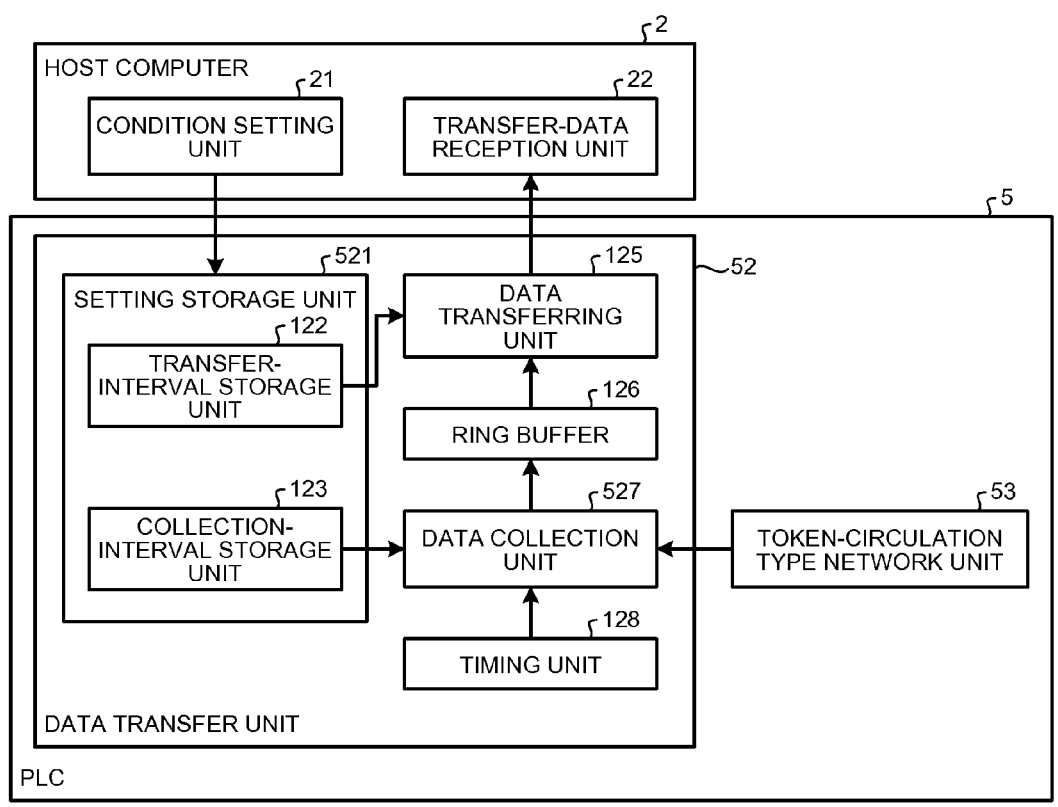
FIG. 11 is an explanatory diagram of a functional configuration of the data transfer unit according to the third embodiment.

FIG. 11 is an explanatory diagram of a functional configuration of the data transfer unit 52 according to the third embodiment. As shown in FIG. 11, the data transfer unit 52 includes a setting storage unit 521, the data transferring unit 125, the ring buffer 126, a data collection unit 527, and the timing unit 128. The setting storage unit 521 further includes the transfer-interval storage unit 122. The host computer 2 includes the condition setting unit 21 and the transfer-data reception unit 22.

The data collection unit 527 receives control data transmitted by the token-circulation type network unit 53 and stores the received control data in the ring buffer 126. At the time of storing the control data in the ring buffer 126, the data collection unit 527 acquires the present time from the timing unit 128, and adds the acquired present time to the control data to store the control data in the ring buffer 126.

The data transferring unit 125 transmits the control data stored in the ring buffer 126 to the transfer-data reception unit 22. In the third embodiment, the transfer interval is set in the transfer-interval storage unit 122 based on the time or the number of receptions of the control data, and the data transferring unit 125 acquires and transmits the control data accumulated in the ring buffer 126 at the set transfer interval.

As described above, according to the third embodiment of the invention, the FA system includes the token-circulation type network unit 53 as an FA device that constitutes the token-circulation type network in which transmission and reception of control data is performed via the shared memory, and outputs the control data in the shared memory when holding a token, and the data collection unit 527 collects the control data outputted by the token-circulation type network unit 53. Accordingly, the data transfer unit 52 can collect the control data in synchronization with a token circulation cycle.

REFERENCE SIGNS LIST 1, 4, 5 PLC
2 host computer
3 controlled device
11 CPU unit
12 data transfer unit
13 input/output unit
21 condition setting unit
22 transfer-data reception unit
23 device-data setting unit
42 data transfer unit
52 data transfer unit
53 token-circulation type network unit
111 device-data storage unit
121 setting storage unit
122 transfer-interval storage unit
123 collection-interval storage unit
124 transfer-data storing-position storage unit 125 data transferring unit
126 ring buffer
127 data collection unit
128 timing unit
400 sequence number
521 setting storage unit
527 data collection unit

The invention claimed is:

1. A data transfer device comprising:
a collection-interval storage unit that stores therein a collection interval set by a high-order device;
a data-specification storage unit that stores a type of control data related to an FA system, which is set by the high-order device;
a data collection unit that reads the collection interval stored in the collection-interval storage unit and the type of the control data stored in the data-specification storage unit, and collects control data of the read type from the FA system at the read collection interval;
a transfer-interval storage unit that stores therein a transfer interval set by the high-order device, which is equal to or larger than the collection interval stored in the collection-interval storage unit;
a temporary storage unit that accumulates and stores therein the control data collected by the data collection unit; and
a data transferring unit that reads the transfer interval stored in the transfer-interval storage unit, and collectively transfers the control data collected by the data collection unit, which is accumulated and stored in the temporary storage unit, at the read transfer interval to the high-order device,
wherein when the collection interval stored in the collection-interval storage unit is updated by the high-order device, the data collection unit reads the updated collection interval to change the collection interval at which the control data is collected to the updated collection interval,
wherein the control data is configured to be transferred to the high-order device on a real-time basis for monitoring of the control data by setting the transfer interval equal to the collection interval.

2. The data transfer device according to claim 1, wherein after having transferred the control data to the high-order device, the data transferring unit determines whether or not the high-order device has received the transferred control data, and when the high-order device has not received the control data, retransmits the control data after connection with the high-order device has been established.

3. The data transfer device according to claim 1, wherein the FA system includes a programmable controller having a device-data storage unit that stores therein device data sequentially updated, and the control data collected by the data collection unit is the device data stored in the device-data storage unit.

4. The data transfer device according to claim 3, wherein a storing position of the device data to be transferred in the device-data storage unit is set in the data-specification storage unit to describe the type set by the high-order device, and
the data collection unit collects the device data stored at the storing position set in the data-specification storage unit.

5. The data transfer device according to claim 4, wherein when the storing position set in the data-specification storage unit is updated by the high-order device, the data collection unit reads the updated storing position to change the storing position of the device data to be collected to the updated storing position.

6. The data transfer device according to claim 5, wherein the high-order device updates the storing position stored in the data-specification storage unit based on a predetermined rule.

7. The data transfer device according to claim 3, further comprising a device-data write unit that receives a device data setting command transmitted from the high-order device and updates the device data stored in the device-data storage unit based on the received device data setting command.

8. The data transfer device according to claim 1, wherein
the FA system comprises an FA device that constitutes a token-circulation type network in which transmission and reception of control data is performed via a shared memory, and outputs control data in the shared memory at the time of holding a token, and
the data collection unit collects the control data outputted by the FA device.

9. The data transfer device according to claim 1, wherein when the transfer interval stored in the transfer-interval storage unit is updated by the high-order device, the data transfer unit reads the updated transfer interval to change the transfer interval at which the control data accumulated and stored in the temporary storage unit and collected by the data collection unit is transferred, to the updated transfer interval.

10. The data transfer device according to claim 9, wherein the high-order device updates the transfer interval stored in the transfer-interval storage unit based on a predetermined rule.

11. The data transfer device according to claim 1, wherein the high-order device updates the collection interval stored in the collection-interval storage unit based on a predetermined rule.

* * * * *